Aug. 7, 1962 G. N. WILLIS 3,048,260
VIBRATOR FOR MATERIAL CONVEYING APPARATUS
Filed July 15, 1959 4 Sheets-Sheet 1

INVENTOR.
GRANT N. WILLIS
BY
Lindsey and Prutzman
ATTORNEYS

INVENTOR.
GRANT N. WILLIS
BY
*Lindsey and Prutzman*
ATTORNEYS

Aug. 7, 1962 G. N. WILLIS 3,048,260
VIBRATOR FOR MATERIAL CONVEYING APPARATUS
Filed July 15, 1959 4 Sheets-Sheet 3

INVENTOR.
GRANT N. WILLIS
BY
Lindsey and Prutzman
ATTORNEYS

Aug. 7, 1962 G. N. WILLIS 3,048,260
VIBRATOR FOR MATERIAL CONVEYING APPARATUS
Filed July 15, 1959 4 Sheets-Sheet 4

INVENTOR.
GRANT N. WILLIS
BY
Lindsey and Prutzman
ATTORNEYS

United States Patent Office 3,048,260
Patented Aug. 7, 1962

3,048,260
VIBRATOR FOR MATERIAL CONVEYING APPARATUS
Grant N. Willis, Bristol, Conn., assignor to Arthur G. Russell Company, Inc., Forestville, Conn., a corporation of Connecticut
Filed July 15, 1959, Ser. No. 827,362
21 Claims. (Cl. 198—220)

This invention relates generally to material conveying apparatus of the type employing a vibrating conveying surface and relates, more particularly, to a novel vibrator for use with such conveying apparatus and to the combination of the vibrator with conveyors of various types. This application is a continuation-in-part of the applicant's prior copending application Serial No. 686,751, filed September 27, 1957, now abandoned.

The aim of the present invention is to provide an improved mechanism for imparting vibrations to conveyor surfaces such as utilized in feed hoppers and transfer rails. Included in this aim is the provision of a simple compact mechanism which will have a long trouble-free service life, which will produce the desired vibratory movement and without varying the position of the conveyor relative to the base, which is conveniently adjustable in use of variable amplitude and of variable vertical to horizontal component rates, and which is relatively unaffected by variations in load of material being conveyed.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

This invention is illustrated in the accompanying drawings wherein.

Figure 4:
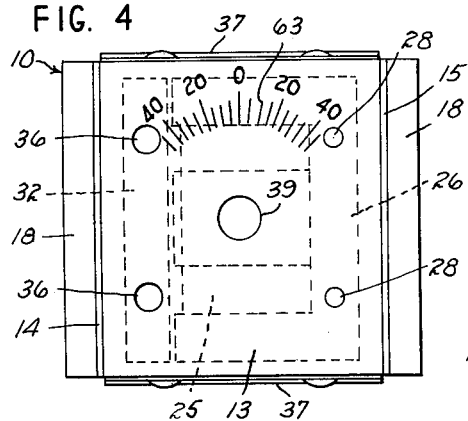
FIG. 4 is a front view of the vibrator of the invention.
Figure 5:
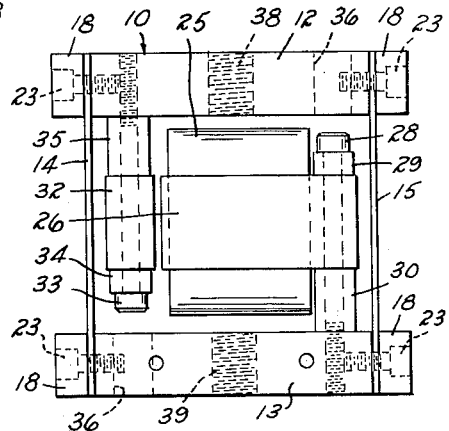
FIG. 5 is a plan view of the vibrator of FIG. 4 with the cover plates removed, and particularly illustrating an electromagnetically energized vibrator cartridge.

Referring first to the vibrator unit of the present invention, and particularly to the embodiment shown in detail in FIGS. 4 and 5, the vibrator is denoted generally by reference numeral 10 and comprises a pair of relatively heavy end plates 12, 13 which are preferably rectangular in shape and formed of rigid metal plate of substantial thickness or gage as shown. The end plates 12, 13 are connected in spaced apart, substantially parallel relationship by means of a pair of normally straight leaf springs or spring plates 14, 15 as best shown in FIG. 5. The leaf springs 14, 15 are securely attached to the side edges of the plates 12, 13 by clamps 18 which are held in place by screws 23.

In the use of the vibrator, as will be described more particularly hereinafter, one of the end plates 12, 13 is secured to a base or supporting structure and the other end plate is attached to the structure to be vibrated. The spring plates 14, 15 being formed of material such as spring steel and being flexible, will permit one end plate to vibrate relative to the other while maintaining the end plates during this movement in substantially parallel relationship.

Figure 8:
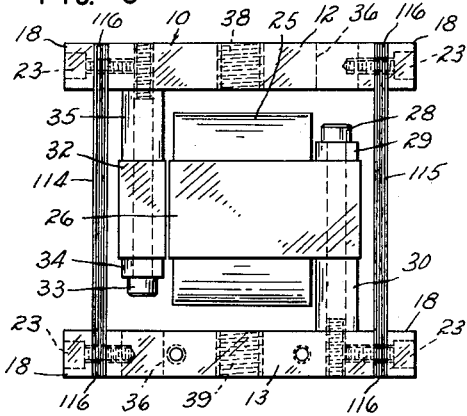
FIG. 8 is a plan view of a modified form of the vibrator with cover plates removed.
Figure 10:
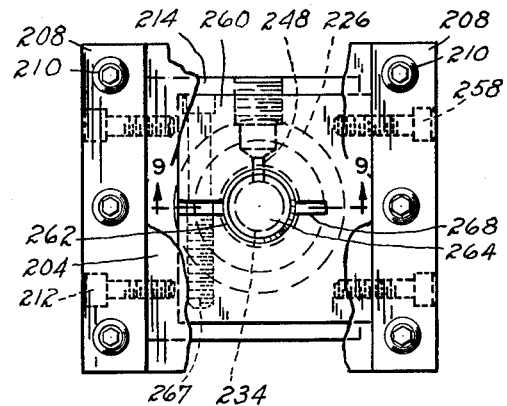
FIG. 10 is a side view of a modified form of vibrator using an air-operated motor with portions of the leaf spring broken away.
Figure 9:
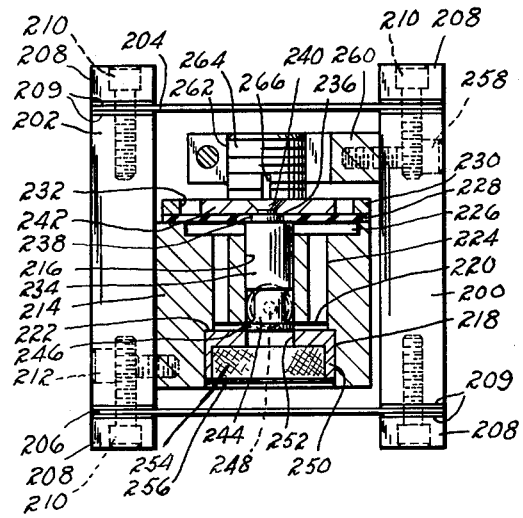
FIG. 9 is a partial section of a modified form of vibrator taken along the line 9—9 of FIG. 10.

For inducing the relative oscillation of the end plates, an actuating means is mounted on the one end plate and a responsive means is mounted on the other end plate so that energization of the actuating means will produce movement in the responsive means, thus imparting relative oscillatory movement between the end plates upon which they are mounted. In FIGS. 5 and 8 the specific oscillatory mechanism is an electromagnetic motor comprised of an electromagnetic coil and armature block. In FIGS. 9 and 10 an air-operated motor mechanism is illustrated, comprised of a cylinder block and diaphragm-supported valve operating against an abutment block. Either of these specific embodiments is suitable for producing the vibratory or oscillatory movement of the present invention.

In the electromagnetic form of vibrator illustrated in FIG. 5, mounted on one of the end plates, which in the specific embodiment illustrated is end plate 13, is an electromagnet comprising a coil 25 having a core 26. The core and coil are mounted on the end plate 13 by means of a plurality of elongated threaded bolts 28 extending through aligned apertures in the core 26 and clamping block 29 and spacer 30. The coil 26 is adapted to be energized from a suitable source of power and is provided with appropriate wiring (not shown) therefor.

On the opposite end plate 12, an armature 32 is positioned so as to be operatively associated with the face of core 26 and extends parallel to and spaced from the face of core 26 when the leaf springs 14, 15 are in the normal unflexed position. The armature 32 is fixedly mounted to the end plate 12 by means such as bolts 33 extending through a clamping block 34 and a spacer 35. The apertures 36 in the end plates 12, 13 shown in FIG. 5 are access openings to permit access to the heads of bolts 28, 33.

The sides of the vibrator 10 are enclosed by side cover plates 37 which are bolted to the side edges of the end plate 13. The cover plates 37 are rectangular sheet metal plates offset as shown so as to provide a slight clearance with the side edges of the opposite end plate 12 and thus to avoid intereference with the vibrating action. The aligned tapped center holes 38, 39 in the end plates 12, 13 respectively are provided in order to provide a convenient mounting for the vibrator which has many advantages in use as will be explained more fully hereinafter.

To operate the electromagnetic vibrator of the present invention, the coil 25 is energized by a pulsating current which, for example, may be a 60-cycle alternating current which is rectified to give pulsating direct current whereby the coil 25 is alternately magnetized and demagnetized. Assuming that the end plate 13 is held fixedly on a base or other supporting surface, the armature 32 will be attracted during the energizing of the solenoid and, since the armature is fixed to the end plate 12, the latter will move longitudinally parallel to the end plate 13. This movement of the end plate 12 is permitted by the spring members 14, 15 which are flexed from their normally straight position during such movement and which provide the restoring force for returning the end plate 12 toward its original position when the coil 25 is de-energized. Thus the end plate 12 is given an oscillating movement substantially parallel to base block 13 at a rate dependent upon the frequency and magnitude of the exciting current, the mass of the end plate 13 and structure attached thereto, and the natural frequency and flexibility of the leaf springs 14, 15 all of which factors may be varied or timed to provide the desired vibrating action.

Figure 11:
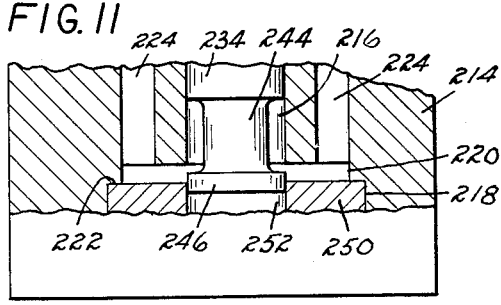
FIG. 11 is an enlarged fragmentary section of the valve structure.

An air-operated vibrator unit is illustrated in FIGS. 9–11, wherein the heavy end plates 200, 202 are connected in spaced apart, substantially parallel relationship by means of a pair of normally straight leaf springs or spring plates 204, 206. The spring plates 204, 206 are secured to the side edges of the plates 200, 202 by clamps 208 which are held in place by screws 210. Shims 209, preferably of a durable synthetic material such as nylon, are provided between the springs and the clamping surfaces.

Mounted on the end plate 202 by screws 212 is a cylinder block 214 having a centrally disposed bore 216 substantially parallel to the end plate 202. At the lower end of the block 214, the bore 216 is reamed to provide an enlarged outer cylindrical recess 218 and an inner cylindrical recess 220 of lesser diameter which cooperate to define a radial shoulder 222.

A pair of axial air passages 224 parallel to the bore 216 communicate between the inner recess 220 and the shallow cylindrical counterbore 226 at the upper end of the block 214. The diaphragm 228, preferably of neoprene or other durable resilient material, is mounted over the counterbore 226 by the diaphragm retainer plate 230 and screws (not shown). As illustrated, the retainer plate 230 has a circular opening 232 substantially equal to the counterbore 226 and the diaphragm 228 is free to flex over the diaphragm chamber defined thereby.

A cylindrical valve 234 slidably seated in the bore 216 has a projecting portion 236 on its upper end which extends through the aperture 238 in the diaphragm 228, and is mounted thereon by cap screw 240 and the valve retainer disc 242, which is of lesser diameter than the circular opening 232 in the diaphragm retainer plate 230 to permit the diaphragm to flex freely. Spaced from the lower end of the valve 234 is a neck portion 244 of reduced diameter which provides a terminal collar 246 disposed slightly below the inner recess 220 in the at-rest position, as indicated in FIG. 11. The valve 234 is preferably fabricated from a durable synthetic material such as nylon to minimize friction.

The block 214 is also provided with a radial air inlet 248 communicating between the bore 216 adjacent the neck portion 244 of the valve and the exterior, and this inlet is desirably threaded at its outer end for attachment to a compressed air supply (not shown).

Seated in the recess 218 is a cup insert 250 having its base portion in abutment against the shoulder 222 and with a central aperture 252 in registry with the bore 216. A felt muffler 254 is mounted in the cup insert 250 by the perforated retainer disc 256.

Mounted on the other end plate 200 by the screws 258 is the block 260 which has a centrally disposed opening 262 aligned with valve 234. Threadably seated in the opening 262 is the adjusting screw 264 with its lower end in abutment against the valve retainer disc 240. The adjusting screw 264 may be moved relative to the retainer disc 240 by engagement of a tool in the slot 266, and is locked in position by means of a clamping screw 267 which extends through the block 260 and compresses the cross-cut 268.

In the operation of this embodiment, compressed air from a suitable source is introduced through the inlet 248 into the bore 216. In the at-rest position of the valve, the collar 246 is slightly below the radial air passage provided by the inner recess 220 between the bore 216 and the axial air passages 224. When air pressure is applied through inlet 248, it passes through the passages 220, 224 into the counterbore 226 on the lower side of the diaphragm 228, and the air pressure causes the diaphragm to flex and pull the valve 234 upwards in the bore 216.

During this upward movement, the valve retainer disc 240 abuts the bottom of the adjusting screw 264 and thereby exerts upward pressure on the block 260. The upward movement of the diaphragm 228 also causes the collar 246 of the valve 234 to move upwardly of the inner recess 220 thus sealing off the recess from air coming in through inlet 248. This allows the air under the diaphragm 228 in counterbore 226 to exhaust to the atmosphere through the opening 252, muffler 254 and perforated retainer disc 256.

This reciprocal movement of the diaphragm 228 and valve 234 relative to the cylinder block 214, which is mounted on the end plate 202, and the pressure exerted thereby upon the block 260, which is mounted on the end plate 200, causes the springs 204, 206 to deflect. Upon release of the air pressure behind the diaphragm 228, the springs 204, 206 will reverse the flexural movement of the diaphragm and valve. When the valve moves below the inner recess 220, compressed air will again be channeled to the counterbore 226 to flex the diaphragm and move the valve and its retainer disc outwardly against the adjusting screw 264, and the cycle will be repeated.

This flexure of the springs 204, 206 imparts a relative oscillatory movement between the end plates 200, 202 at a rate determined by the natural frequency of the system, and the amplitude of this oscillatory movement can be readily changed by varying the magnitude of the air pressure applied to the inlets 248.

In the embodiment of the vibrator unit shown in FIG. 8 of the drawings, all of the parts are the same as those of FIG. 5 except that a plurality of leaf springs 114 are substituted for leaf spring 14 and a plurality of leaf springs 115 are substituted for the leaf spring 15. The individual springs are separated by thin non-metallic spacers 116 which in the specific embodiment are formed of nylon. The principal advantage in using multiple springs 114, 115 in place of a single spring 14, 15 is that adjusting or tuning the vibrator unit for use in a particular installation is facilitated.

In practice, when the vibrator unit is driven by electromagnetic means energized by an electric current of fixed frequency, it is found that the performance of the vibrator unit is greatly improved by adjusting the natural frequency of the assembly. This tuning or adjusting can be done with single leaf springs 14, 15 by grinding down the springs until the desired natural frequency is attained. With the multiple springs 114, 115, however, the same result can be attained more quickly and easily merely by substituting one or more leaf springs of different thickness or adding or subtracting from the number of springs used. So far as the operation of the device is otherwise concerned, the function of a single spring 14, 15 or multiple springs 114, 115 is the same.

The purpose of the non-metallic spacers 116 is that, when several steel springs are clamped together in face to face contact, it is found that a fretting corrosion will usually take place at the boundary of the clamps 18. This corrosion is effectively avoided in accordance with the invention by means of the spacers 116 referred to which prevent metal to metal contact of the adjacent springs.

It is understood that, although the plurality of springs has been shown in the electromagnetic embodiment, this feature may likewise be employed in the air-operated form of vibrator.

Figure 1:
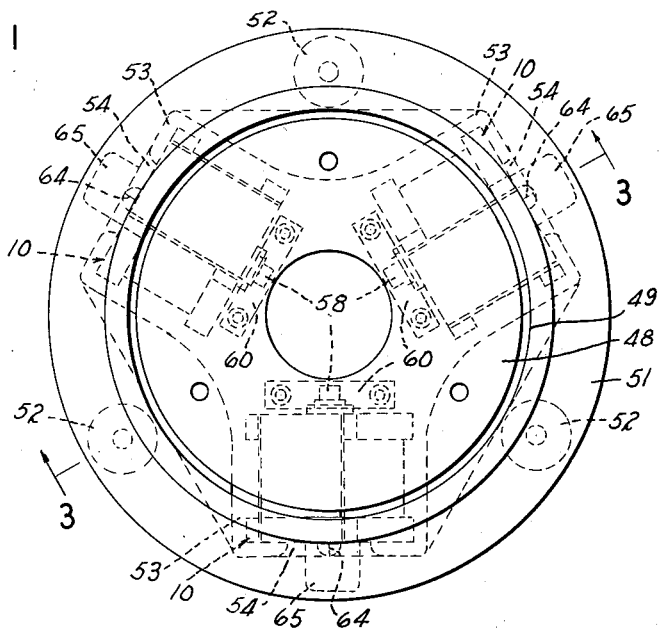
FIG. 1 is a plan view of a hopper type of material conveying apparatus embodying the invention.
Figure 2:
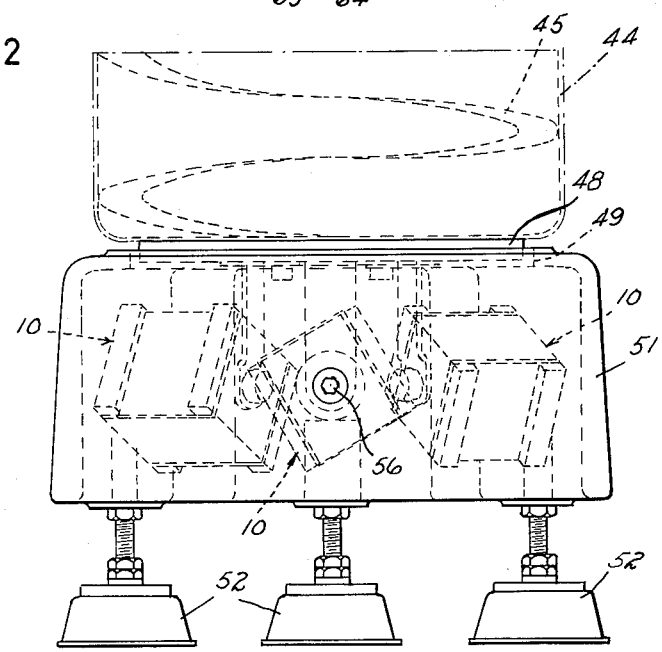
FIG. 2 is an elevational view partially in phantom of the apparatus of FIG. 1.
Figure 3:
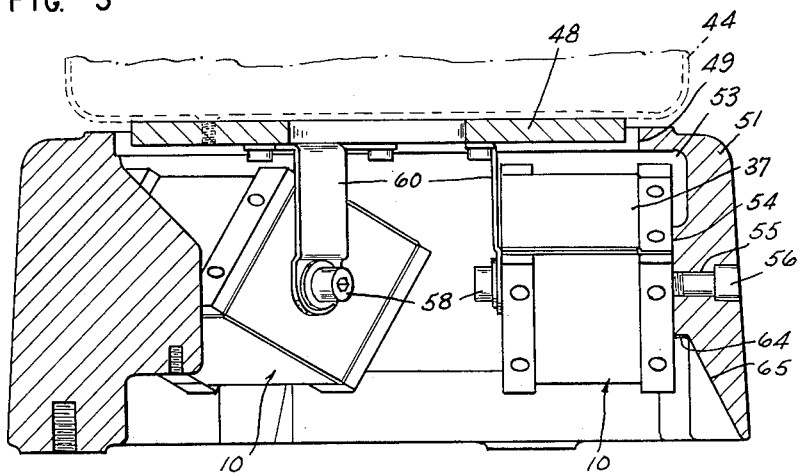
FIG. 3 is a fragmentary enlarged sectional view taken substantially along line 3—3 of FIG. 1.

It is contemplated that the vibrator 10 of the present invention may be employed to impart vibration to various types of conveying apparatus such as hoppers and transfer rails. A particular advantage of the vibrator 10 is that it can be used as both the supporting and the vibrating structure for the conveyor and may be readily adjusted to vary the ratio of horizontal to vertical component of the vibrations produced. A specific example of the use of the vibrator in combination with a hopper having a helical conveying surface or ramp is illustrated in FIGS. 1–3. Referring to FIGS. 1–3, the hopper or bowl is indicated by reference numeral 44 and the helical conveying surface or ramp is denoted by reference numeral 45. The bottom of the hopper 44 has bolted thereto an annular base plate 48 which is accommodated within the larger top opening 49 of the base 51 which is supported on a plurality of adjustable legs 52.

As shown best in FIG. 1, the base 51 in the preferred embodiment is formed as a relatively heavy metal casting provided with a plurality of radially spaced inner recesses 53, each of which has an inwardly facing end wall on which is formed a boss 54 having a central opening 55 extending therethrough.

In each of the base recesses 53, a vibrating cartridge 10 is positioned with the end plate 13 (hereinafter called the "fixed end plate") in flush engagement with the boss 54 and fixedly held thereto by means such as screw 56 extending through opening 55 and threaded within the mounting opening 39 in the fixed end plate.

The other end plate 12 (hereinafter called the "movable end plate") is attached by means of its central opening 38 and screw 58 in hopper supporting arrangement to a spring bracket 60 whose upper end is bolted to the underside of the hopper base plate 48. In the preferred embodiment, there are three vibrators 10 and three spring brackets 60, all similarly mounted 120 degrees apart and providing the sole supporting means for the hopper 44. It should be noted that the spring brackets 60 are formed of relatively flat and wide straps so that there is substantial rigidity parallel to the face of the movable end plate 12 but, at the same time, there is provided a limited degree of torsional flexibility to accommodate for the slight rotational movement of the hopper 44 which takes place during the vibrating operation.

With the vibrators so mounted between the base 51 and hopper 44 and operated in unison (which, in the electromagnetic embodiment, is preferably accomplished by connecting all the vibrators to the same source of pulsating current), it will be apparent that the hopper will be vibrated or oscillated relative to the base. As will be understood from a consideration of FIGS. 1–3, the mounting of the vibrators 10 on an axis formed by the tapped openings 38, 39 and screws 56, 58 permits the vibrators 10 to be rotatably adjustable and that the angle at which the vibrators are mounted determines the angle at which vibrations will be transmitted to the hopper. The rotational adjustment of the vibrators 10 does not vary the height or position of the hopper relative to the base 51.

In order to determine the angular position in which each of the vibrators 10 is mounted, a scale 63 as shown in FIG. 4 is suitably inscribed on the outer face of end plate 13 so as to cooperate with a stationary pointer or reference line 64 inscribed in a cutaway portion 65 of each of the bosses 54 and visible to the operator from the underside of the base. When the vibrator 10 is positioned with the pointer 64 at the zero position on scale 63 and the solenoid is energized, oscillations would be imparted to the hopper in a horizontal direction only, and thus no material would be conveyed along the helical surface 45 in the hopper. As the cartridge is rotated from the zero position in either direction, there is added a vertical component of movement which increases in proportion to the horizontal component as the vibrator is turned from the zero position. Thus by merely adjusting the rotated position of the vibrators, a desired ratio of these components can be obtained for maximum conveying results. In general, the normal operating range is within the rotated angles of 15 to 45 degrees. Also, since the direction of rotation can be quickly reversed by turning the vibrators in the opposite direction, the same base and vibrator assembly may be used with either left-hand or right-hand helical ramps. The use of a plurality of vibrators 10 spaced about and supporting a circular hopper 44 as shown in FIGS. 1–3 of the drawings illustrates how vibrations may be imparted to such a hopper to obtain a so-called "screw effect."

Figure 6:
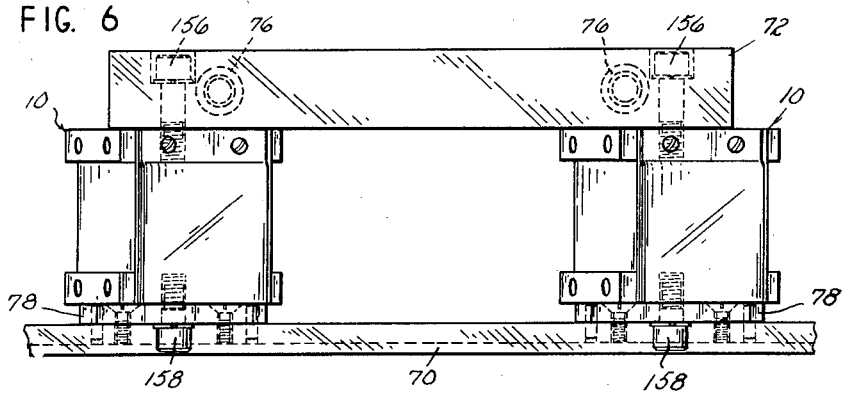
FIG. 6 is a fragmentary plan view showing vibrators of the invention applied to a horizontal rail assembly.
Figure 7:
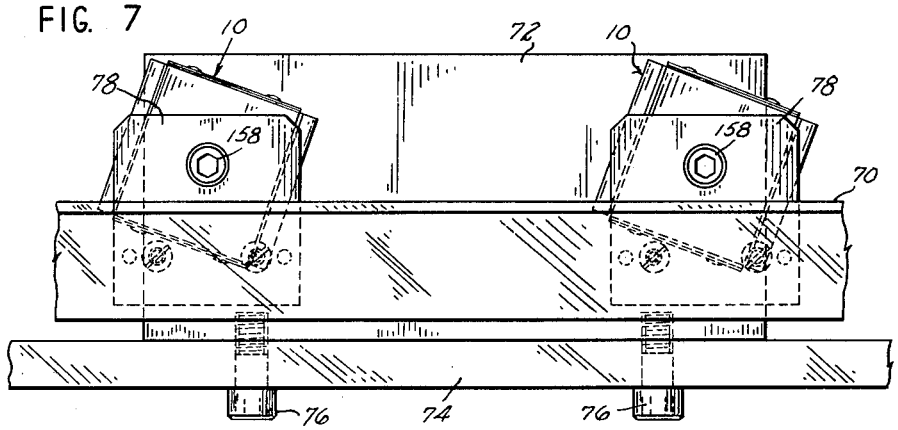
FIG. 7 is a front view of the mechanism shown in FIG. 6.

FIGS. 6 and 7 illustrate the application of the invention to horizontal rail assemblies. Referring to these figures, the horizontal rail on which the parts are to be fed or moved horizontally is denoted by the reference numeral 70. The vibrators 10 (two are shown) are mounted on an upright wall 72 which is secured to the base or platform 74 by screws 76. As in the previous example, the fixed end plate is secured to the wall 72 in rotatably adjustable position by a screw 156. The movable end plate 12 is secured to one end of a flexible plate 78 by screw 158 and the other end of plate 78 is secured by screws to the horizontal rail 70. As in the previous example, the vibrators 10 serve as the support for the rail 70 as well as providing the desired vibratory movement. Also, as in the previous example, the desired ratio of vertical to horizontal components of movements is readily adjusted merely by adjusting the rotated position of the vibrators 10.

Thus it will be seen that there has been provided a vibrator which is of extremely compact and rugged construction which in a single unit provides both the support and vibrating mechanism for use in a wide variety of applications where vibration is required. The unit is particularly adapted for use with hoppers having helical material conveying equipment. In such use, the unit is quickly adjustable to provide the desired ratio of vertical to horizontal components of movement as well as a reversal of direction. The unit is subject to a minimum of wear, and fatigue or other failure is substantially overcome.

The air-operated vibrator unit has particular advantage over the electromagnetic type for use under flammable or explosive conditions, such as for the transport of ammunition or where explosive gases are present in the environment. Additionally, the structure will vibrate at the natural frequency of the assembly so that the necessity for matching the frequency of the assembly to the frequency of the input current is obviated.

The foregoing description of the specific embodiments of the invention have been given as illustrative of the practice of the invention. It is contemplated that variations and modifications may be made within the skill of the art, and all such variations and modifications are intended to be included within the scope of the invention.

I claim:

1. A combination supporting and vibrator unit for use with a material conveying structure comprising a pair of end plates arranged in spaced apart parallel relationship, normally parallel leaf springs in spaced apart relationship fixed to and supporting the end plates for relative oscillating movement in a parallel direction, means for oscillating the end plates relative to each other, means for mounting one end plate on a supporting structure, and a flexible spring strap attached at one end to other end plate and extending generally parallel thereto in spaced relationship and having means at its outer end for forming a supporting connection to a structure to be vibrated.

2. A combination supporting and vibrator unit for use with a material conveying structure comprising a pair of end plates arranged in spaced apart parallel relationship; spaced apart leaf springs fixed to and supporting the end plates for relative oscillating movement in a parallel direction; means for oscillating the end plates relative to each other comprising actuating means mounted on one end plate and responsive means mounted on the other end plate; adjustable connecting means disposed centrally of one end plate for mounting the said one end plate on a supporting structure in a selected rotated position; and a strap attached centrally to the other end plate and pivotally adjustable for connection to a structure to be vibrated.

3. A combination supporting and vibrator unit for use with a material conveying structure comprising a pair of end plates arranged in spaced apart parallel relationship; flexible supporting means extending between the plates to permit relative oscillating movement of the end plates in a generally parallel direction comprising a plurality of leaf springs fixedly secured to one side of each plate and a plurality of leaf springs parallel to the first named leaf spring fixedly secured to the other side of each plate; a plurality of individual non-metallic spacers disposed only between the ends of each plurality of leaf springs preventing metal to metal contact of the springs; and means for oscillating the end plates relative to each other comprising actuating means mounted on one of said end plates and responsive means mounted on the other of said end plates in operative relationship with the actuating means.

4. A combination supporting and vibrator unit for use with a material conveying structure comprising a pair of rigid metal end plates arranged in spaced apart parallel relationship; spaced apart leaf springs fixed to and supporting the end plates in spaced apart parallel relationship and permitting oscillating movement of one end plate relative to the other in a generally parallel direction; means for oscillating the end plates relative to each other comprising actuating means attached to one end plate and responsive means attached to the other end plate; means for attaching the end plates to associated structures; and cover plates for enclosing the space between the end plates and springs, each cover plate being fixed to one end plate and overlying the other end plate and springs, said cover plate being separate from the other end plate and the springs to permit movement of the cover plate relative to said other end plate and the springs.

5. In combination, a supporting base; a plurality of vibrators each comprising a first end plate secured in an upright position to the base with the side edges thereof inclined to the vertical, spaced apart leaf springs secured to the side edges of the first end plate, a second end plate secured to and supported by the leaf springs in parallel relationship to the first end plate for oscillating movement in a direction generally parallel thereto, and means for oscillating the second end plate relative to the first end plate; and a material conveying structure supported on said second end plates.

6. In combination, a supporting base; a plurality of vibrators, each comprising a first end plate mounted in a vertical plane on said base and rotatably adjustable in a vertical plane thereon, said end plate having parallel side edges inclined to the vertical, spaced apart leaf springs secured to the side edges of the first end plate and extending at right angles thereto, a second end plate secured to and supported by the leaf springs in parallel relationship to the first end plate, and means for oscillating the second end plate relative to the first end plate; and a material conveying structure supported on said second end plates.

7. In combination, a supporting base; a hopper having a helical material conveying surface disposed above the base; and a plurality of vibrators disposed in angularly related positions about the hopper, each having a first end plate secured in an upright position to the base, a second end plate secured in an upright position to the hopper, leaf springs interconnecting the end plates and maintaining them in parallel spaced apart relationship, said leaf springs being flexible in a direction lying in a plane inclined to the vertical to permit the second end plate to oscillate in a direction generally parallel to the first end plate, and means for oscillating the second end plate relative to the first end plate.

8. In combination, a supporting base; a hopper having a helical material conveying ramp; and a plurality of vibrators disposed in angularly related positions about the hopper, each having a vertical end plate secured to the base and a second vertical end plate secured to the hopper, leaf springs interconnecting and supporting the end plates for relative oscillating movement in parallel spaced apart planes, and means secured to the plates for oscillating the second end plate relative to the first end plate, and means for rotatably adjusting the position of the vertical end plates about a horizontal axis.

9. In combination, a supporting base; a hopper having a helical material conveying ramp; a plurality of vibrators disposed in angularly related positions about the hopper and forming the sole support therefor, each vibrator comprising a first end plate secured to the base in vertical position and being rotatably adjustable thereon, a second end plate parallel to the first end plate, spaced apart leaf springs connected to the end plates and supporting the second end plate for oscillating movement relative to the first end plate, and means for oscillating the second end plate relative to the first end plate; and a torsionable member connecting each of said second end plates to the hopper to support the hopper for oscillating movement with said second end plates.

10. In combination, a supporting base; a hopper having a helical material conveying ramp therein; a plurality of vibrators disposed in angularly related positions about the hopper, each vibrator comprising a first vertical end plate secured to the base and rotatably adjustable thereon, a second vertical end plate parallel to and spaced from the first vertical end plate, spaced apart leaf springs interconnecting the end plates and supporting the second end plate for oscillating movement parallel to the first end plate, and means supported on the inner surfaces of the end plates for oscillating the second end plate relative to the first end plate; and a plurality of metal straps each connected at one end to one of the second end plates and secured at the other end to the hopper.

11. In combination, a supporting base; a plurality of vibrators, each comprising a first end plate mounted in a vertical plane on said base and rotatably adjustable thereon, scale means for indicating the rotated position of the first end plate relative to the base, spaced apart leaf springs secured to the first end plate and extending at right angles thereto, a second end plate secured to and supported by the leaf springs in parallel relationship to the first end plate, and means for oscillating the end plates relative to each other comprising actuating means attached to one end plate and responsive means attached to the other end plate; a connecting member attached to each of the second end plates and rotatably adjustable thereon, and a material conveying structure secured to and supported on the connecting member.

12. In combination, a supporting base; three vibrators circularly arranged on the base in spaced relationship, each vibrator comprising a vertical first end plate secured to the base, a second end plate spaced from and parallel to the first end plate, spaced apart leaf springs secured to the end plates for supporting the second end plate in parallel relationship to the first end plate and permitting oscillation of the second end plate relative to the first end plate in a generally parallel direction, and means for oscillating the said plates relative to each other comprising actuating means attached to one end plate and responsive means attached to the other end plate; a hopper having a helical material conveying surface therein, and torsionable means forming a supporting connection between the hopper and the second end plates of the vibrators.

13. In combination, a supporting base; a plurality of vibrators each comprising a first end plate secured to the base, spaced apart leaf springs secured to the first end plate, a second end plate secured to and supported by the leaf springs in parallel relationship to the first end plate, said leaf springs being flexible to permit oscillating movement of the second end plate generally parallel to the first end plate, motor means for oscillating the second end plate relative to the first end plate, and means responsive to relative movement of the plates for intermittently energizing the motor means; and a material conveying structure supported on said second end plates.

14. In combination, a supporting base; a plurality of vibrators each comprising a first end plate secured to the base, spaced apart leaf springs secured to the first end plate, a second end plate secured to and supported by the leaf springs in parallel relationship to the first end plate, said leaf springs being flexible to permit oscillating movement of the second end plate generally parallel to the first end plate, air-operated motor means for oscillating the second end plate relative to the first end plate, and valve means responsive to relative movement of the plates for periodically admitting air to the air motor; and a material conveying structure supported on said second end plates.

15. The combination supporting and vibrator unit for use with a material conveying structure comprising a pair of spaced apart end plates, means for mounting the end plates in an upwardly extending plane, spaced apart leaf springs secured at opposite ends to said base end plates, said end plates and leaf springs forming a normally rectangular structure permitting oscillation of one plate in a direction substantially parallel to the other plate, an air cylinder block on one of said end plates, an abutment block on the other end plate, and a diaphragm-supported valve reciprocable in said cylinder block to exert pressure upon said abutment block in response to air pressure in said cylinder block to oscillate said end plates relative to each other.

16. In combination, a feed rail having a material conveying surface; a supporting base; and a plurality of vibrators spaced lengthwise of the feed rail, each of said vibrators comprising a first end plate mounted substantially vertically on the supporting base, a second end plate parallel to the first end plate and secured to the feed rail, said end plates having side edges inclined to the vertical, spaced apart leaf springs interconnecting the side edges of the end plates and permitting oscillating movement of the second end plate in a direction generally parallel to the first end plate, and means for oscillating the second end plate relative to the first end plate in a generally parallel direction.

17. In combination, a feed rail having a material conveying surface; a supporting base; and a plurality of vibrators spaced lengthwise of the feed rail, each of said vibrators comprising a first end plate mounted substantially vertically on the supporting base, a second end plate parallel to the first end plate and secured to the feed rail, said end plates having side edges inclined to the vertical, spaced apart leaf springs interconnecting the side edges of the end plates and permitting oscillating movement of the second end plate in a direction generally parallel to the first end plate, means for oscillating the second side edges of the end plate relative to the first end plate in a generally parallel direction, and means for rotatably adjusting the vibrators on an axis transverse to the end plates.

18. A combination supporting and vibrator unit for use with a material conveying structure comprising a pair of spaced apart end plates, spaced apart leaf springs secured to opposite edges of the end plates to maintain the end plates in substantially parallel opposed relationship but permitting oscillating movement of one plate relative to the other plate in a substantially parallel plane, connecting means for mounting one end plate on a vertically extending supporting surface and for attaching a material conveying structure to the other end plate with the leaf springs extending horizontally between the end plates, said connecting means being arranged to load the unit in a direction generally parallel to the end plates and being adjustable to permit the unit to be rotated about a horizontal axis transverse of the end plates, and motor means on the end plates for imparting oscillating movement to said one end plate.

19. A combination supporting and vibrator unit for use with a material conveying structure comprising a pair of spaced apart end plates, spaced apart leaf springs secured to opposite edges of the end plates at right angles thereto forming a normally rectangular structure maintaining the end plates in substantially parallel relationship and permitting oscillating movement of one end plate relative to the other end plate, motor means on the end plates for imparting oscillating movement to said one end plate, and connecting means for attaching the said one end plate to a material conveying structure and the other end plate to a supporting base with the end plates extending vertically, said end plates being rotatable relative to the connecting means about a horizontal axis transverse of the end plates to adjust the direction of oscillation of said one end plate.

20. A combination supporting and vibrator unit for use with a material conveying structure comprising a pair of spaced apart end plates having parallel side edges, spaced apart leaf springs secured to opposite side edges of the end plates at right angles thereto forming a normally rectangular structure maintaining the end plates in substantially parallel relationship and permitting oscillating movement of one end plate relative to the other end plate in a direction generally parallel to said other end plate, motor means comprising an actuator mounted on said other end plate and responsive means mounted on said one end plate, said motor means being disposed parallel to the end plates to impart a force therebetween parallel to the end plates, means for mounting the said other end plate vertically on a supporting base with the side edges thereof in a selected inclined position relative to the vertical, and means for attaching the said one end plate vertically to a material conveying structure.

21. In combination, a supporting base, a material conveying structure, and a plurality of supporting and vibrator units interconnecting the base and material conveying structure, each of said units comprising a pair of end plates with one end plate mounted vertically on the base and the other end plate mounted vertically on the material conveying structure in opposed parallel relationship to the said one end plate, supporting members extending horizontally between the plates and permitting the said other end plate to oscillate in a vertical plane relative to said one end plate in a direction inclined to the vertical, and motor means mounted on the end plates for imparting oscillating movement to said other end plate.

References Cited in the file of this patent
UNITED STATES PATENTS

| | | |
|---|---|---|
| 2,063,687 | Lefrand | Dec. 8, 1936 |
| 2,187,717 | Weyandt | Jan. 23, 1940 |
| 2,385,328 | Brown et al. | Sept. 25, 1945 |
| 2,549,322 | McKinsey | Apr. 17, 1951 |
| 2,630,209 | Carrier | Mar. 3, 1953 |
| 2,799,383 | Spurlin | July 16, 1957 |
| 2,845,168 | Smith et al. | July 29, 1958 |
| 2,868,357 | Thomas | Jan. 13, 1959 |
| 2,896,941 | Stump | July 28, 1959 |